United States Patent
VanBlon et al.

(10) Patent No.: US 9,875,224 B1
(45) Date of Patent: Jan. 23, 2018

(54) DISPLAYING PRESENTATION NOTES

(71) Applicant: LENOVO (Singapore) PTE, LTD., New Tech Park (SG)

(72) Inventors: Russell Speight VanBlon, Raleigh, NC (US); Richard Wayne Cheston, Pittsboro, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 133 days.

(21) Appl. No.: 14/560,987

(22) Filed: Dec. 4, 2014

(51) Int. Cl.
*G06F 17/20* (2006.01)
*G06F 17/24* (2006.01)
*G06F 17/30* (2006.01)

(52) U.S. Cl.
CPC ...... *G06F 17/241* (2013.01); *G06F 17/30056* (2013.01)

(58) Field of Classification Search
CPC .................................. G06F 17/30056
USPC .................................. 715/732, 730
See application file for complete search history.

(56) References Cited

U.S. PATENT DOCUMENTS

| | | | | |
|---|---|---|---|---|
| 5,917,480 A * | 6/1999 | Tafoya | ...................... | G06T 1/00 715/732 |
| 7,711,722 B1 * | 5/2010 | Sahasi | ............... | G06F 17/30056 707/705 |
| 2004/0002049 A1 * | 1/2004 | Beavers | ................... | G09B 5/00 434/350 |
| 2008/0282167 A1 * | 11/2008 | Beamish | ................. | G09B 5/02 715/730 |
| 2011/0066957 A1 * | 3/2011 | Prats | ...................... | G06F 17/241 715/753 |
| 2011/0209056 A1 * | 8/2011 | Choudhary | ........... | G06F 9/4443 715/702 |
| 2014/0053071 A1 * | 2/2014 | Penner | ................... | G06Q 10/10 715/732 |
| 2014/0282013 A1 * | 9/2014 | Amijee | ................. | G06F 3/0482 715/732 |
| 2015/0132735 A1 * | 5/2015 | Edge | ........................ | G09B 5/02 434/308 |

OTHER PUBLICATIONS

E.A. Vander Veer, PowerPoint 2007: The Missing Manual, O'Reilly, 2006 pp. 433-436.*
Add, change, or delete a comment in a presentation Applies to: PowerPoint 2007, https://support.office.com/enus/article/Addchangeordeleteacommentinapresentation8f071fa6e5d4c37a0251cf48a76eb38, 4 pages.*
<https://www.pcreview.co.uk/threads/powerpointresizenotesfontinnormalview. 2741144/>, PowerPoint resize notes font in normal view, Nov. 28, 2006, 4 pages.*

* cited by examiner

*Primary Examiner* — Mohammed-Ibrahim Zuberi
(74) *Attorney, Agent, or Firm* — Kunzler PC (57) ABSTRACT

An apparatus, method, and program product for displaying presentation notes includes receiving one or more content elements for a slide of a presentation, determining whether a content element of the one or more content elements is a note element, and overlaying the note element over one or more different content elements presented on the slide such that the note element is visible on the slide.

18 Claims, 5 Drawing Sheets

DISPLAYING PRESENTATION NOTES

FIELD

The subject matter disclosed herein relates to presentations and more particularly relates to displaying presentation notes on a slide of a presentation.

BACKGROUND

Description of the Related Art

Slide show presentations may be used as visual aids to assist a presenter who is presenting to one or more people in an audience. A slide show presentation typically presents a series of slides on an electronic display in a prearranged order. Each slide of the slide show presentation may be displayed for a period of time before the next slide is shown. Slides may comprise various content, such as text, images, etc., as selected by a creator of the slide show, who is typically also the presenter. It may be useful for a presenter to add notes to slides of the slide show presentation to assist the presenter during the presentation without displaying the presenter's notes to the audience.

BRIEF SUMMARY

An apparatus for displaying presentation notes is disclosed. A method and computer program product also perform the functions of the apparatus. In one embodiment, an apparatus includes a processor and a memory that stores code executable by the processor. In some embodiments, the code include code that receives one or more content elements for a slide of a presentation. In various embodiments, the code includes code that determines whether a content element of the one or more content elements is a note element. In yet another embodiment, the code includes code that overlays the note element over one or more different content elements presented on the slide such that the note element is visible on the slide.

In one embodiment, the code includes code that adds the note element to a note layer. The note layer may be overlaid over the one or more different content elements on the slide. In some embodiments, the note element is visible in a presenter view without being visible in an audience view. In a further embodiment, the one or more content elements comprise an audience element. The audience element may be visible in an audience view without being visible in a presenter view. In one embodiment, the audience element is added to an audience layer such that the audience layer is visible in an audience view and hidden in a presenter view.

In one embodiment, the one or more content elements comprise a fixed content element that is visible in both a presenter view and an audience view. In a further embodiment, the fixed content element is added to a slide layer, which may comprise the base layer of the slide. In certain embodiments, each content element of the one or more content elements comprises an attribute describing a type for the content element. The type, in some embodiments, defines whether the content element is a note element or a different content element.

In one embodiment, the note element comprises content selected from the group consisting of text content, graphical content, and hand-written content. In a further embodiment, the code includes code that resizes the one or more different content elements in a presenter view. In some embodiments, the code includes code that formats the note element such that the note element is more prominently displayed on the slide than the one or more different content elements. In various embodiments, the note element is assigned to a location on the slide, which may include a location that is beyond a boundary of the slide in a presenter view.

A method, in one embodiment, includes receiving one or more content elements for a slide of a presentation. In a further embodiment, the method includes determining, by use of a processor, whether a content element of the one or more content elements is a note element. In another embodiment, the method includes overlaying the note element over one or more different content elements presented on the slide such that the note element is visible on the slide.

In certain embodiments, the method includes adding the note element to a note layer, which may be overlaid over the one or more different content elements on the slide. In a further embodiment, the note element is visible in a presenter view without being visible in an audience view. In another embodiment, each content element of the one or more content elements comprises an attribute describing a type for the content element. The type, in some embodiments, defines whether the content element is a note element or a different content element. In one embodiment, the method includes formatting the note element such that the note element is more prominently displayed on the slide than the one or more different content elements.

A program product includes a computer readable storage medium that stores code executable by a processor. In one embodiment, the executable code includes code to perform receiving one or more content elements for a slide of a presentation. In a further embodiment, the executable code includes code to perform determining whether a content element of the one or more content elements is a note element. In another embodiment, the executable code includes code to perform overlaying the note element over one or more different content elements presented on the slide such that the note element is visible on the slide.

In one embodiment, the executable code includes code to perform adding the note element to a note layer, which may be overlaid over the one or more different content elements on the slide. In a further embodiment, the note element is visible in a presenter view without being visible in an audience view.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
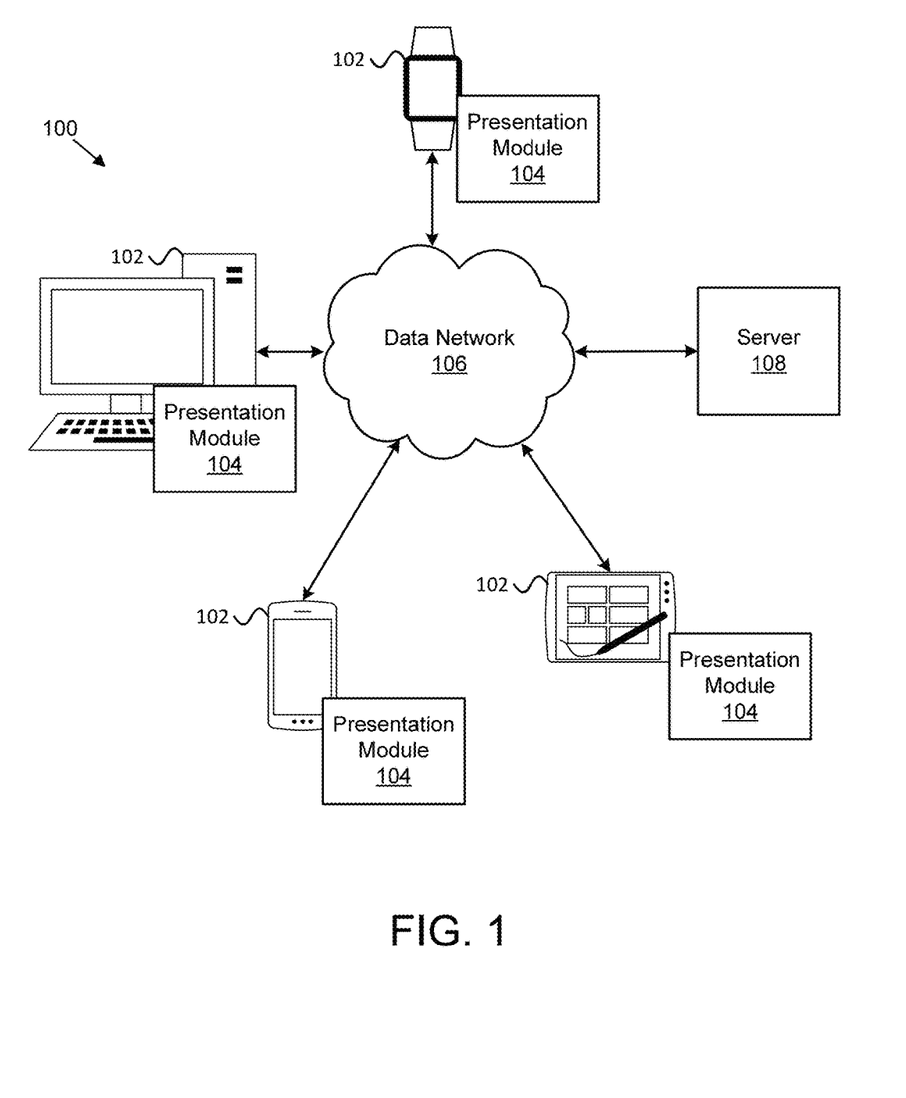
FIG. 1 is a schematic block diagram illustrating one embodiment of a system for displaying presentation notes.

FIG. 1 depicts one embodiment of a system 100 for displaying presentation notes. In one embodiment, the system 100 includes information handling devices 102, presentation modules 104, data networks 106, and servers 108. Even though a specific number of information handling devices 102, presentation modules 104, data networks 106, and servers 108 are depicted in FIG. 1, one of skill in the art will recognize that any number of information handling devices 102, presentation modules 104, data networks 106, and/or servers 108 may be included in the system 100.

In one embodiment, the information handling devices 102 comprise computing devices, such as desktop computers, laptop computers, personal digital assistants (PDAs), tablet computers, smart phones, smart televisions (e.g., televisions connected to the Internet), set-top boxes, game consoles, or the like. In some embodiments, the information handling devices 102 comprise wearable devices, such as smart watches, fitness bands, optical head-mounted displays, or the like. In one embodiment, the information handling devices 102 are configured to display, present, share, or the like, presentations, such as slide show presentations. In certain embodiments, the slide show presentation is created and/or displayed using a slide show presentation program. Examples of various slide show presentation programs include PowerPoint® by Microsoft® of Redmond, Wash., Keynote® by Apple® of Cupertino, Calif., or the like. Slide show presentation programs may include various functions for adding, inserting, manipulating, etc., content elements on one or more slides of a presentation, such as text, graphics, animations, hyperlinks, multimedia, or the like. Additionally, slide show presentation programs may include a slide show system for presenting or displaying the content elements of the various slides of a presentation.

The information handling devices 102, and/or the server 108, may include an embodiment of the presentation module 104. In certain embodiments, the presentation module 104 is configured to receive one or more content elements for a slide of a slide show presentation. In a further embodiment, the presentation module 104 is configured to determine whether a content element of the one or more content elements is a note element. The presentation module 104 may overlay the note element over one or more different content elements presented on the slide such that the note element is visible on the slide. In certain embodiments, the presentation module 104 includes various modules that perform one or more of the operations of the presentation module 104, which are described in more detail below with reference to FIG. 2.

The data network 106, in one embodiment, comprises a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

In one embodiment, the servers 108 include computing devices, such as desktop computers, laptop computers, mainframe computers, cloud servers, virtual servers, and/or the like. In some embodiments, the servers 108 are configured as application servers, email servers, database servers, file servers, game servers, home servers, media servers, web servers, and/or the like. In certain embodiments, the servers 108 are communicatively coupled to the information handling devices 102 via the data network such that the information handling devices 102 may store and/or access data on the servers 108 as it relates to the presentation module 104. For example, the servers 108 may store data associated with slide show presentation programs, such as graphics, multimedia files, slide templates, presentations, or the like. In some embodiments, the servers 108 may host cloud-based (e.g., software-as-a-service (SaaS)) presentation programs, such as Prezi® by Prezi, Inc., of San Francisco, Calif.

Figure 2:
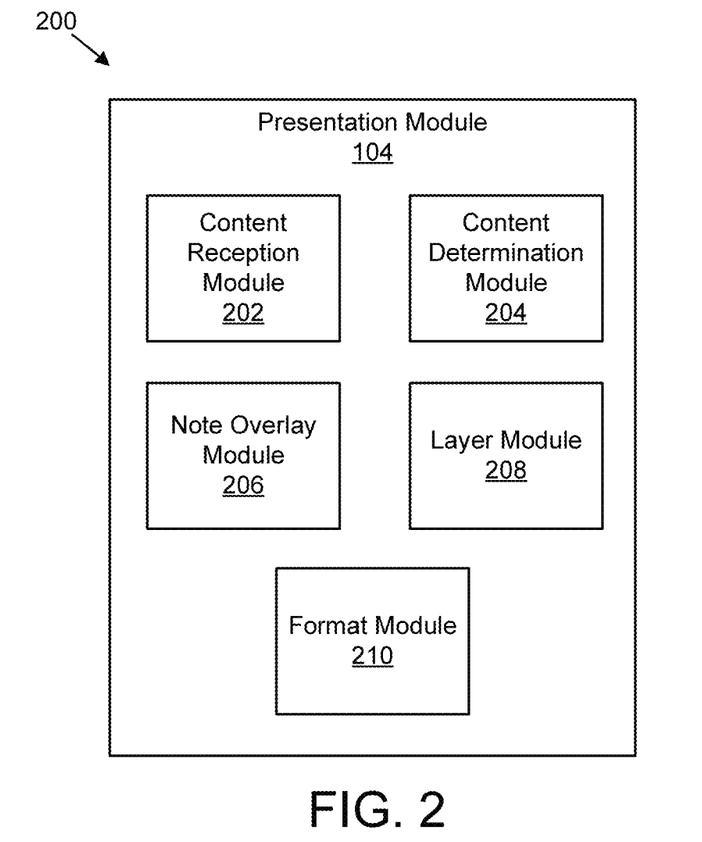
FIG. 2 is a schematic block diagram illustrating one embodiment of a module for displaying presentation notes.

FIG. 2 depicts one embodiment of a module 200 for displaying presentation notes. In one embodiment, the module 200 includes an embodiment of a presentation module 104. The presentation module 104, in certain embodiments, includes a content reception module 202, a content determination module 204, a note overlay module 206, a layer module 208, and a format module 210, which are described in more detail below.

In one embodiment, the content reception module 202 is configured to receive one or more content elements for a slide of a slide show presentation. As used herein, content elements may include text, graphics, animations, multimedia (such as videos, images, and/or audio files), hyperlinks, or the like. In certain embodiments, the content reception module 202 receives one or more content elements from a user. For example, a user may be editing one or more slides and may add various content elements to each slide. A slide, for example, may include some text, a couple images, and an animation.

In some embodiments, however, the user, who may be the presenter of the presentation, may desire to include some notes or talking points on a slide to remind them to discuss, highlight, or explain different points on the slide. Generally, the presenter wants to keep these notes hidden from an audience. Some slide show presentation programs may allow a user to associate notes with a slide, but they may be located in a separate viewing area such that the notes are not near the points on the slide that the presenter intended to associate with the notes. This may cause the presenter, in the heat of the moment of giving a presentation, to forget to discuss certain points described in their notes because they are not located near the points in the slide. Thus, the presenter may forget to glance at the separate note area located away from the slide as he is going through the presentation.

To assist the presenter in remembering to discuss his notes at various points during the presentation, the presentation module 104, in certain embodiments, overlays one or more note elements over one or more different content elements presented on the slides such that the note elements are displayed inline or near points on the slide where the presenter should discuss the notes.

The content determination module 204, in one embodiment, determines whether a content element of the one or more content elements is a note element, such that it can be overlaid over one or more different content elements. To determine whether a content element is a note element, the content determination module 204 may refer to one or more attributes associated with a content element. The one or more attributes, in certain embodiments, may determine or define a type of the content element. In some embodiments, the type of the content element may describe the content element as a note element, an audience element, or a fixed content element.

A note element, as used herein, may be a content element that a presenter or editor of a slide has defined to be a note on the slide, which means that the note element will be overlaid on the slide at a particular location by the note overlay module 206, described below. A content element that has been defined to be a note element, in some embodiments, will be hidden from the audience in an audience view and visible to a presenter in a presenter view. As used herein, an audience view of the presentation comprises content on the slides that an audience sees, which may be a subset of all the content presented on a slide. A presenter view of the presentation, as used herein, comprises content on the slides that a presenter sees, which may also be a subset of all the content presented on a slide. Examples of an audience view of a slide and a presenter view of the slide is described in more detail with reference to FIGS. 3A and 3B.

An audience element, as used herein, may be a content element that a presenter or editor of a slide has defined to be viewable to an audience in an audience view, but not necessarily viewable to a presenter in a presenter view. For example, animations or other graphics may enhance the viewing pleasure of an audience, but may not be useful to a presenter, so a presenter may choose to only show those content elements to an audience. A fixed content element, as used herein, may be a content element that a presenter or editor of a slide has defined to be viewable to both an audience in an audience view and a presenter in a presenter view. For example, the main text of a slide, such as bullet points on a slide, or a graph that is the focus of the slide, may be defined to be fixed content elements so that the audience and the presenter see the content in both of the audience and the presenter views.

In one embodiment, the note overlay module 206, overlays note elements over one or more different content elements, e.g., audience content elements or fixed content elements, presented on the slide such that the note elements are visible on the slide. For example, a slide may include a bullet point that states "First Quarter Sales $1 Million." To remember to elaborate on this performance, the presenter may overlay a note near the bullet point that states "Talk about the forecasted sales growth for the next three quarters," or the like. By overlaying the notes near the content that the presenter is discussing, the presenter will be reminded to discuss her notes as various points during the presentation, which may not be the case if the notes are located in a separate viewing area away from the slide.

In one embodiment, the layer module 208 is configured to present the one or more content elements in one or more layers on the slide. As used herein, a layer may be used to separate different content elements presented on the slide presentation. Content elements may be added or removed to and/or from layers and layers may be added or removed to and/or from the slide. Layers may be stacked on one another on the slide. In various embodiments, the layers are transparent except for the content elements that are presented on the layer such that content elements or other layers below a layer may be visible through the layer.

The layer module 208, in one embodiment, adds one or more note elements to a note layer. In some embodiments, the note overlay module 206 overlays the note layer over one or more different content elements on the slide. For example, a note layer may comprise a plurality of notes and the layer module 208 may overlay the note layer over other text or graphic content elements displayed on the slide. In certain embodiments, the layer module 208 hides the note layer in an audience view such that the notes on the note layer are not visible to an audience. In certain embodiments, the layer module 208 displays the note layer in a presenter view such that the note layer is visible to a presenter of the presentation.

In one embodiment, the layer module 208 adds one or more content elements to an audience layer. In some embodiments, the audience layer comprises content elements that are visible to an audience in an audience view without being visible to a presenter in a presenter view. For example, the layer module 208 may add graphics, animations, multimedia, text, or the like to an audience layer, which may not be visible to a presenter in a presenter view, but may be visible to an audience in an audience view. In this manner, the presenter may not be distracted or overwhelmed by content elements that the presenter does not need to view to perform his presentation. Moreover, removing the audience layer, including one or more audience content elements, from the presenter view provides more available area for notes or other content elements that the presenter may want to view during the presentation, but may want to keep hidden from the audience.

In one embodiment, the layer module 208 adds one or more content elements to a fixed content layer. In certain embodiments, the fixed content layer comprises content elements that are visible to both an audience in an audience view and a presenter in a presenter view. For example, the layer module 208 may add text graphics, multimedia, or the like to the fixed content layer such that both the audience and the presenter can view the content. Typically, the fixed content elements comprise content elements that are the focus of the presentation, such as text (e.g., bullet points, titles, etc.), graphics (e.g., charts, images, etc.), or the like. In one embodiment, the fixed content layer comprises the base layer for the slide, and the overlay module 206 may overlay a note layer, or one or more note elements, over the fixed content layer.

In some embodiments, the layer module 208 creates a plurality of note layers (e.g., one for each note element), a plurality of audience layers (e.g., one for each audience content element), and/or a plurality of fixed content layers (e.g., one for each fixed content element). In one embodiment, the layer module 208 selectively enables, activates, or selects one or more layers for viewing in an audience view, a presenter view, or both. For example, a presenter may choose to view an audience layer in a presenter view or may choose to make the presenter view visible to an audience, or the like.

In one embodiment, the format module 210 is configured to format the one or more content elements, e.g., note elements, audience content elements, and/or fixed content elements, in an audience and/or a presenter view. In one embodiment, the format module 210 formats note elements such that the note elements are more prominently displayed on the slide than other content elements. For example, the format module 210 may highlight note elements, draw borders around note elements, display note elements in a bigger font, and/or the like, such that the note elements are more easier to view for a presenter.

In a further embodiment, the format module 210 resizes one or more content elements in a presenter view. The format module 210, for example, may present textual note elements in a bigger font that other textual content elements. Similarly, the format module 210 may present fixed content elements, audience content elements, or the like, in a smaller font such that the note elements are more prominently presented than the other content elements. For example, the format module 210 may reduce the size of the font for a slide title, or other content elements, that are visible to the presenter in a presenter view, but may not be important for the presenter to perform his presentation.

In one embodiment, the format module 210 is configured to assign one or more content elements to a location on a slide. In certain embodiments, the format module 210 assigns, associates, or otherwise places a note element in a specific location on the slide and/or the layer. In some embodiments, the format module 210 assigns a note element to a location on the slide and/or the layer in response to user input. For example, the format module 210 may associate a note element with a top corner location of a note layer in response to a presenter or editor dragging-and-dropping the note element on that location. In certain embodiments, the format module 210 places a content element, such as a note element, at a location that extends beyond a boundary of the slide in a presenter view. For example, the presentation of the slide in a presenter view may include an out-of-bounds area that surrounds a perimeter of the slide. In the audience view, the out-of-bounds area may not be visible to an audience, but in a presenter view, the format module 210 may place content elements at a location such that the content elements extend beyond the bounds of the slide into the out-of-bounds area, which provides more usable space for notes and other content elements.

In certain embodiments, the format module 210 prepares a slide, or a plurality of slides, of a presentation for exporting. The format module 210, for example, may prepare a slide to be saved to a particular format, such as a portable document format (PDF), an image format (e.g., JPEG, PNG, etc.), or the like. The format module 210 may also prepare a slide to be printed. The format module 210 may combine different layers or different content elements into a single layer to prepare the slide for exporting.

Figure 3A:
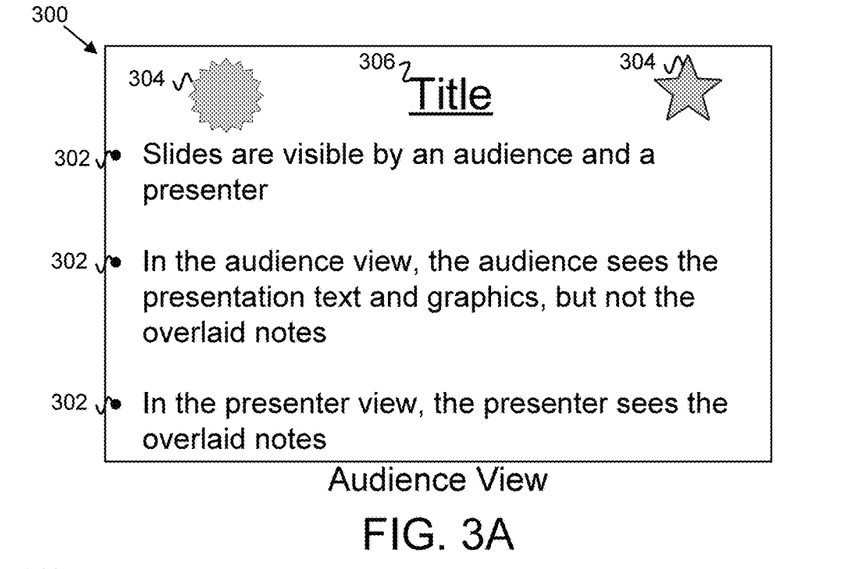
FIG. 3A illustrates one embodiment of an audience view of a presentation.
Figure 3B:
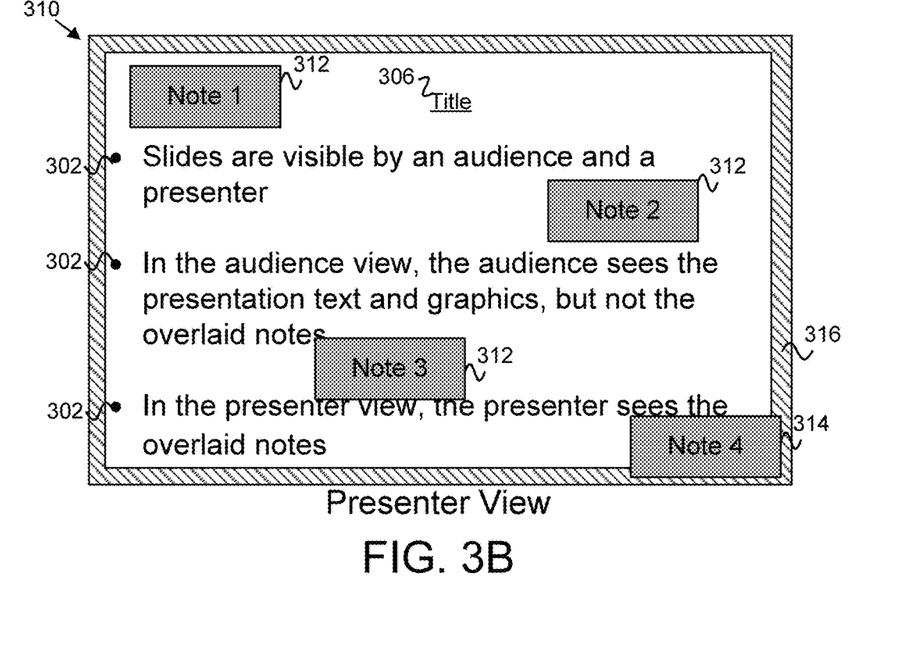
FIG. 3B illustrates one embodiment of a presenter view of a presentation.

FIG. 3A illustrates one embodiment of an audience view of a presentation and FIG. 3B illustrates one embodiment of a presenter view of the same presentation. In one embodiment, a slide 300 is presented to an audience in an audience view. The slide 300 may comprise fixed content elements 302 (such as text items that are visible to both the presenter and the audience), audience content elements 304 (such as graphics, etc., that are not visible in the presenter view), and a title 306 (which may also be a fixed content element visible to both the presenter and the audience). FIG. 3B also includes a version of a slide 310 that includes a plurality of note elements 312 that are visible to a presenter in a presenter view, but not to an audience in the audience view.

In one embodiment, the layer module 208 places the fixed content elements 302, 306 in a slide layer that may become the base layer for the slides 300, 310. The layer module 208 may also place the audience content elements 304 in an audience layer that is visible to an audience in an audience view, but not visible to a presenter in a presenter view. For example, the layer module 208 may remove the audience layer, including audience content elements 304, from the presenter view. In a further embodiment, the note overlay module 206 overlays one or more note elements 312, 314 on the slide 310 in the presenter view. In some embodiments, the layer module 208 places the note elements 312, 314 on a note layer, which may be visible in a presenter view of the slide 310, but not the audience view of the slide 300.

In a further embodiment, the format module 210 may format one or more of the content elements such that the content elements for an audience in an audience view and/or a presenter in a presentation view. For example, the format module 210 may reduce the font size of the title 306 in a presenter view because the title 306 may not be one of the more important aspects of the slide 300, 310 that the presenter needs to view to perform his presentation. In some embodiments, the format module 210 places the note elements 312, 314 at a particular location on the slide 310. In one embodiment, the format module 210 places the note elements 312, 314 at a location in response to user input, e.g., in response to a user dragging-and-dropping a note element to a location on the slide. In a further embodiment, the format module 210 places the note elements at a position on the slide 310 that extends beyond the viewable boundaries of the slide 300, 310. For example, a note element 314 may extend beyond the boundaries of the slide 310 and into an out-of-bounds area 316 that is not visible to the audience in an audience view.

Figure 4:
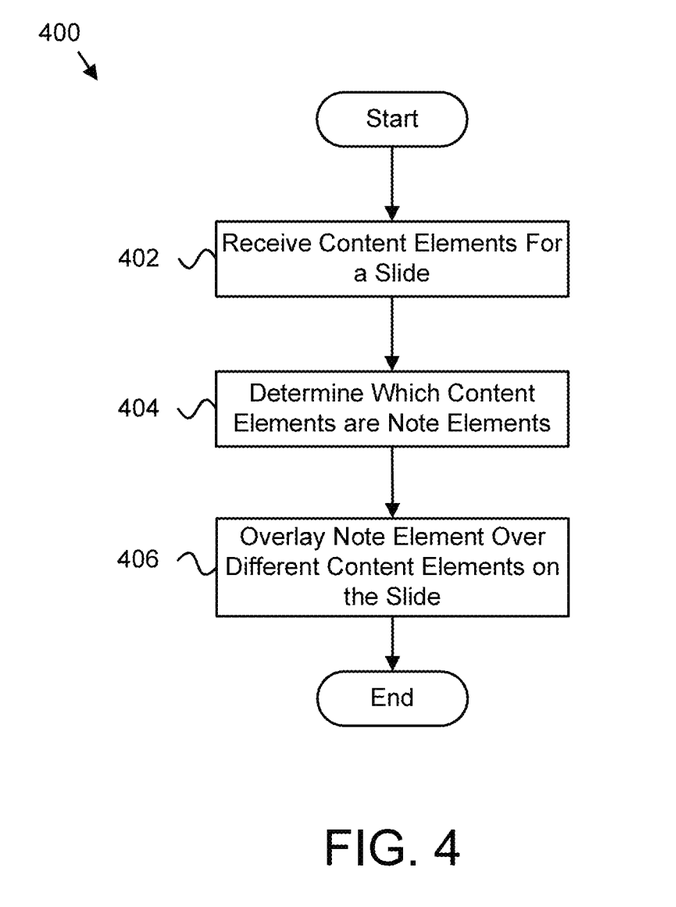
FIG. 4 is a schematic flow chart diagram illustrating one embodiment of a method for displaying presentation notes.

FIG. 4 is a schematic flow chart diagram illustrating one embodiment of a method 400 for displaying presentation notes. In one embodiment, the method 400 begins and the content reception module 202 receives 402 one or more content elements for a slide of a slide show presentation. In certain embodiments, the content determination module 204 determines 404 which content elements of the one or more received content elements are note elements. In a further embodiment, the note overlay module 206 overlays 406 the note elements over one or more different content elements presented on the slide such that the note elements are visible on the slide, and the method 400 ends.

Figure 5:
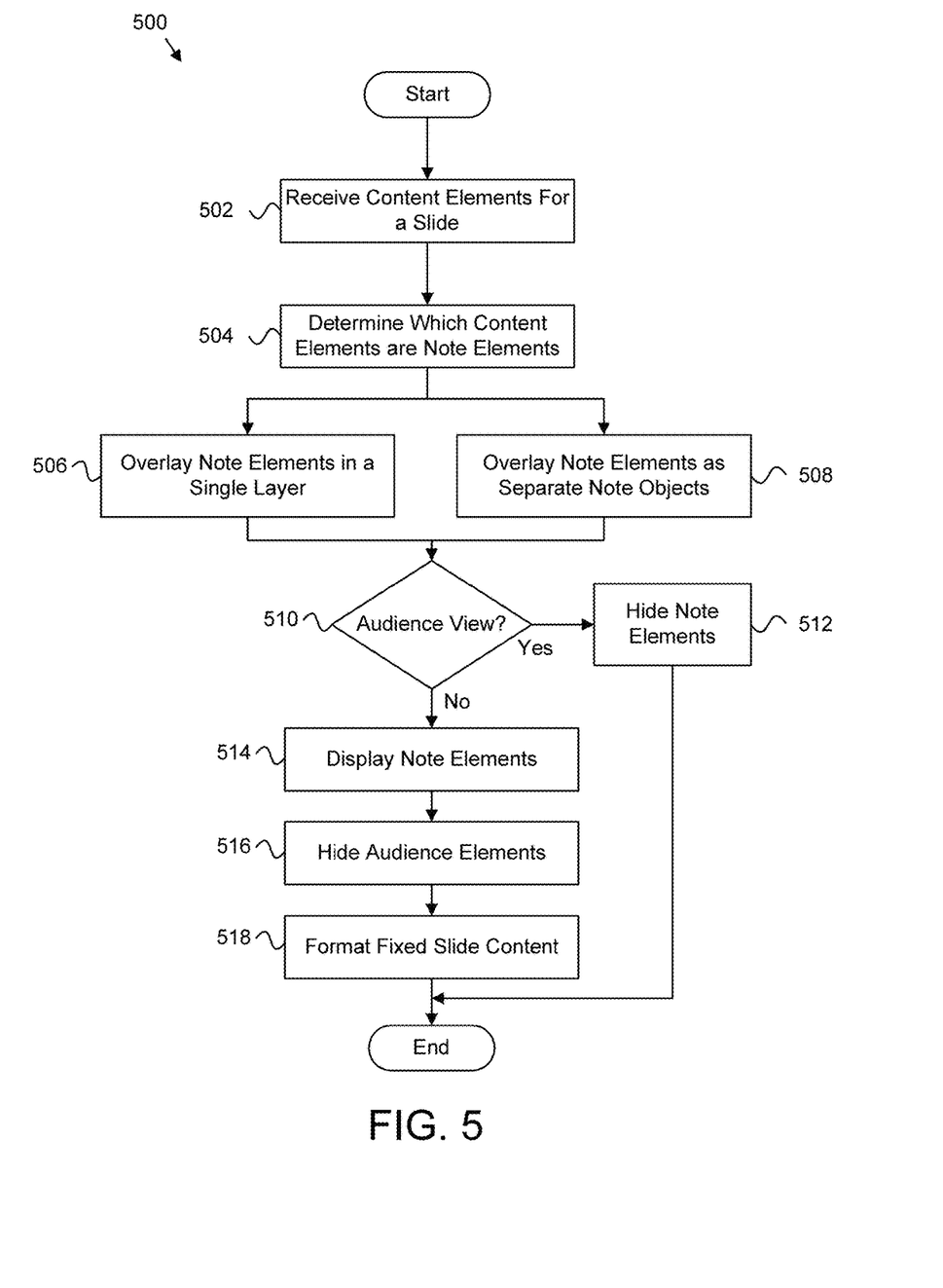
FIG. 5 is a schematic flow chart diagram illustrating one embodiment of another method for displaying presentation notes.

FIG. 5 is a schematic flow chart diagram illustrating one embodiment of a method 500 for displaying presentation notes. In one embodiment, the method 500 begins and the content reception module 202 receives 502 one or more content elements for a slide of a slide show presentation. In certain embodiments, the content determination module 204 determines 504 which content elements of the one or more received content elements are note elements. In one embodiment, the content determination module 204 references one or more attributes of a content element that define the content element's type, such as note element, audience content element, or fixed content element. In a further embodiment, the layer module 208 places the note elements on a single note layer and the note overlay module 206 overlays 506 the note layer on the slide. In some embodiments, the note overlay module 206 overlays 508 the note elements as separate note objects on a slide.

In some embodiments, the note overlay module 206 and/or the layer module 208 determines 510 whether the slide is in an audience view or a presenter view. In one embodiment, if the slide is in an audience view, the note overlay module 206 and/or the layer module 208 hides 512 the note elements from the slide so that they are not visible to the audience, and the method 500 ends. In some embodiments, if the note overlay module 206 and/or the layer module 208 determines that the slide is in a presenter view, the note overlay module 206 and/or the layer module 208 displays 514 the note elements on the slide. In a further embodiment, the layer module 208 hides 516 the audience content elements from a presenter view such that the audience content elements are not visible to a presenter. In some embodiments, the format module 208 formats 518 one or more fixed content elements in a presenter view such that they are more or less prominently displayed in the presenter view as opposed to the audience view of the fixed content elements, and the method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor, the code comprising:
   code that receives one or more content elements for a slide of a presentation;
   code that determines whether a content element of the one or more content elements is a note element;
   code that overlays the note element over one or more different content elements presented on the slide such that the note element is visible on the slide during presentation of the slide; and
   code that determines font sizes for the note element relative to font sizes of the one or more different content elements;
   code that formats, in response to the slide being presented and in response to determining the font sizes of the note element relative to the font sizes of the one or more different content elements, one or more of:
      the note element such that the note element is formatted in a larger font on the slide as a function of the font sizes of the one or more different content elements; and
      the one or more different content elements such that one or more of the different content elements is formatted in a smaller font on the slide as a function of the font sizes of the note element.

2. The apparatus of claim 1, further comprising code that adds the note element to a note layer, the note layer being overlaid over the one or more different content elements on the slide.

3. The apparatus of claim 1, wherein the note element is visible in a presenter view without being visible in an audience view.

4. The apparatus of claim 1, wherein the one or more content elements comprise an audience element, the audience element being visible in an audience view without being visible in a presenter view.

5. The apparatus of claim 4, wherein the audience element is added to an audience layer, the audience layer being visible in an audience view and hidden in a presenter view.

6. The apparatus of claim 1, wherein the one or more content elements comprise a fixed content element that is visible in both a presenter view and an audience view.

7. The apparatus of claim 6, wherein the fixed content element is added to a slide layer, the slide layer comprising the base layer of the slide.

8. The apparatus of claim 1, wherein each content element of the one or more content elements comprises an attribute describing a type for the content element, the type defining whether the content element is a note element or a different content element.

9. The apparatus of claim 1, wherein the note element comprises content selected from the group consisting of text content, graphical content, and hand-written content.

10. The apparatus of claim 1, further comprising code that resizes the one or more different content elements in a presenter view.

11. The apparatus of claim 1, wherein the note element is assigned to a location on the slide, the location comprising a location that is beyond a boundary of the slide in a presenter view.

12. A method comprising:
   receiving one or more content elements for a slide of a presentation;
   determining, by use of a processor, whether a content element of the one or more content elements is a note element;

overlaying the note element over one or more different content elements presented on the slide such that the note element is visible on the slide during presentation of the slide; and determining font sizes for the note element relative to font sizes of the one or more different content elements;

formatting, in response to the slide being presented and in response to determining the font sizes of the note element relative to the font sizes of the one or more different content elements, one or more of:

the note element such that the note element is formatted in a larger font on the slide as a function of the font sizes of the one or more different content elements; and     the one or more different content elements such that one or more of the different content elements is formatted in a smaller font on the slide as a function of the font sizes of the note element.

13. The method of claim 12, further comprising adding the note element to a note layer, the note layer being overlaid over the one or more different content elements on the slide.

14. The method of claim 12, wherein the note element is visible in a presenter view without being visible in an audience view.

15. The method of claim 12, wherein each content element of the one or more content elements comprises an attribute describing a type for the content element, the type defining whether the content element is a note element or a different content element.

16. A program product comprising a computer readable storage medium that stores code executable by a processor, the executable code comprising code to perform:

receiving one or more content elements for a slide of a presentation;

determining whether a content element of the one or more content elements is a note element;

overlaying the note element over one or more different content elements presented on the slide such that the note element is visible on the slide during presentation of the slide; and determining font sizes for the note element relative to font sizes of the one or more different content elements;

formatting, in response to the slide being presented and in response to determining the font sizes of the note element relative to the font sizes of the one or more different content elements, one or more of:

the note element such that the note element is formatted in a larger font on the slide as a function of the font sizes of the one or more different content elements; and     the one or more different content elements such that one or more of the different content elements is formatted in a smaller font on the slide as a function of the font sizes of the note element.

17. The program product of claim 16, further comprising code to perform adding the note element to a note layer, the note layer being overlaid over the one or more different content elements on the slide.

18. The program product of claim 16, wherein the note element is visible in a presenter view without being visible in an audience view.

\* \* \* \* \*